(12) United States Patent
Petrov et al.

(10) Patent No.: US 11,984,113 B2
(45) Date of Patent: May 14, 2024

(54) METHOD AND SERVER FOR TRAINING A NEURAL NETWORK TO GENERATE A TEXTUAL OUTPUT SEQUENCE

(71) Applicant: YANDEX EUROPE AG, Lucerne (CH)

(72) Inventors: Aleksei Sergeevich Petrov, Krasnoznamensk (RU); Sergey Dmitrievich Gubanov, Tambov (RU); Sergey Aleksandrovich Gaydaenko, g Mytishchi (RU)

(73) Assignee: Direct Cursus Technology L.L.C, Dubai (AE)

( * ) Notice: Subject to any disclaimer, the term of this patent is extended or adjusted under 35 U.S.C. 154(b) by 224 days.

(21) Appl. No.: 17/490,620

(22) Filed: Sep. 30, 2021

(65) Prior Publication Data
US 2022/0108685 A1 Apr. 7, 2022

(30) Foreign Application Priority Data
Oct. 6, 2020 (RU) ................................ 2020132862

(51) Int. Cl.
*G10L 15/00* (2013.01)
*G06F 40/166* (2020.01)
(Continued)

(52) U.S. Cl.
CPC .......... *G10L 15/063* (2013.01); *G06F 40/166* (2020.01); *G06F 40/40* (2020.01);
(Continued)

(58) Field of Classification Search
None
See application file for complete search history.

(56) References Cited

U.S. PATENT DOCUMENTS 10,141,006 B1 * 11/2018 Burciu ................ G09B 21/006
10,572,598 B2 2/2020 Chakraborty et al.
(Continued)

FOREIGN PATENT DOCUMENTS

CN 109885683 A 6/2019
CN 109977220 A 7/2019
(Continued)

OTHER PUBLICATIONS

Zantal-Wiener, "How Do You Optimize for Voice Search? Our Experts Weigh In", Published on Mar. 8, 2018, https://blog.hubspot.com/marketing/how-to-optimize-for-voice-search.
(Continued)

*Primary Examiner* — Satwant K Singh
(74) *Attorney, Agent, or Firm* — BCF LLP

(57) ABSTRACT

Method and server for training an Attention-based Neural Network (ANN) to generate a textual output sequence being a content summary to be used as a response to a query. The ANN has an encoder and a decoder sub-network. The method includes, (i) inputting a query and input sequence into the encoder sub-network where the input sequence is a sequence of input groups associated with corresponding content snippets, (ii) generating an encoded representation of the input sequence, which includes generating attention-type outputs for respective words from the input sequence by applying an attention-limiting mask configured to attend only to words from the given input group, (iii) generating a decoded representation being a predicted textual output sequence, (iv) generating a penalty and (iii) adjusting the ANN based on the penalty score.

20 Claims, 7 Drawing Sheets

(51) Int. Cl.
*G06F 40/40* (2020.01)
*G06N 3/045* (2023.01)
*G06N 3/08* (2023.01)
*G10L 13/02* (2013.01)
*G10L 15/06* (2013.01)
*G10L 15/16* (2006.01)
*G10L 15/22* (2006.01)
*G10L 15/30* (2013.01)

(52) U.S. Cl.
CPC ............... *G06N 3/045* (2023.01); *G06N 3/08* (2013.01); *G10L 13/02* (2013.01); *G10L 15/16* (2013.01); *G10L 15/22* (2013.01); *G10L 15/30* (2013.01)

(56) References Cited

U.S. PATENT DOCUMENTS

| | | |
|---|---|---|
| 2008/0154591 A1 | 6/2008 | Kujirai et al. |
| 2009/0187516 A1 | 7/2009 | Kanungo et al. |
| 2013/0091128 A1 | 4/2013 | Radinsky et al. |
| 2020/0104746 A1* | 4/2020 | Strope ..................... G06N 5/04 |
| 2020/0380418 A1* | 12/2020 | Strope ................ G06F 16/3344 |
| 2022/0277015 A1* | 9/2022 | Zhang ............... G06F 16/90344 |
| 2023/0274089 A1* | 8/2023 | Tunstall-Pedoe ..... G06F 40/279 704/2 |
| 2023/0274094 A1* | 8/2023 | Tunstall-Pedoe ....... G06F 40/30 704/9 |

FOREIGN PATENT DOCUMENTS

| | | |
|---|---|---|
| CN | 110134782 A | 8/2019 |
| CN | 110750240 A | 2/2020 |
| JP | 2020038687 A | 3/2020 |
| RU | 2731335 C2 | 9/2020 |

OTHER PUBLICATIONS

Ning et al., "Examining users' partial query modification patterns in voice search", Published on Apr. 29, 2019, https://asistdl.onlinelibrary.wiley.com/doi/abs/10.1002/asi.24238.

Russian Search Report dated Nov. 7, 2022 issued in respect of the counterpart Russian Patent Application No. RU 2020132862.

* cited by examiner

METHOD AND SERVER FOR TRAINING A NEURAL NETWORK TO GENERATE A TEXTUAL OUTPUT SEQUENCE

CROSS-REFERENCE

The present application claims priority to Russian Patent Application No. 2020132862, entitled "Method and Server for Training a Neural Network to Generate a Textual Output Sequence", filed Oct. 6, 2020, the entirety of which is incorporated herein by reference.

FIELD

The present technology relates to intelligent personal assistant systems and, more particularly, to a method and an electronic device for training a Neural Network to generate a textual output sequence.

BACKGROUND

Electronic devices, such as smartphones and tablets, are configured to provide access to an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board or a touch screen). For example, a user who is driving or a user who is visually-impaired may not be able to use the touch screen key board associated with some of these devices.

Intelligent Personal Assistant (IPA) systems have been developed to perform functions in response to user requests. Such IPA systems may be used, for example, for information retrieval and navigation. A conventional IPA system, such as Siri® IPA system for example, can accept simple human natural language inputs from a device and perform a large variety of tasks for the user. For example, a user can communicate with Siri® IPA system by providing spoken utterances (through Siri®'s voice interface) for asking, for example, what the current weather is, where the nearest shopping mall is, and the like. The user can also ask for execution of various applications installed on the electronic device.

Conventional IPA systems are configured to provide voice-enabled search querying capabilities to users. For example, conventional IPA systems may be configured to generate a textual representation of an uttered query and may be configured to launch a search for relevant information.

SUMMARY

Intelligent Personal Assistant (IPA) systems are used to provide voice-enabled interactivity between users and electronic devices. This ability can allow users to conveniently interact with devices, for example, when the user is visually impaired, when the device does not have a traditional visual display (e.g., smart speakers), and/or when the user's hands or eyes are otherwise occupied (e.g., driving).

Developers of the present technology have appreciated certain technical drawbacks associated with the existing IPA systems. At least one drawback of conventional IPA systems is their limited voice-based querying capabilities, or more particularly, their limitation when providing "answers" in an audible format. This is mainly due to the fact that when users expect an answer in an audible format, they generally prefer concise answers—however, designing an IPA system with the ability to provide concise summaries of information in response to a variety of queries that users can potentially submit is a technically challenging task. For example, some conventional systems are ill-suited for generating a summary of relevant content which is concise enough for being suitable for provision in an audible format to the user. In another example, other conventional systems are ill-suited for leveraging context in which content is provided for generating a better content summary thereof.

It is an object of the present technology to ameliorate at least some of the inconveniences present in the prior art. Developers of the present technology envisaged a system where some content having been identified as relevant for a given query is processed by a Neural Network (NN). In at least some non-limiting embodiments of the present technology, it can be said that this NN is an Attention-type NN (ANN) having an encoder sub-network and a decoder sub-network configured for processing sequences of data, and where the encoder sub-network has a particular attention mechanism.

In at least some non-limiting embodiments of the present technology, it can be said that the attention mechanism of the encoder sub-network is configured to apply an "attention-limiting mask" onto the input sequence of data. It is contemplated that the input data sequence can have "input groups" corresponding to respective content snippets from content relevant to a given query obtained, for example, from a search engine server that is configured to execute web searches in response to user search queries. When applied onto a given element of the input sequence that has been labelled with such input groups, the attention-limiting mask allows the encoder sub-network to "attend" to the context within the input group of the given element, as opposed to attending to contexts from other input groups. Therefore, it can be said that the context extracted for the given element via this particular attention mechanism is based on the context within the input group of the given element, instead of other contexts from other input groups.

In a first broad aspect of the present technology, there is provided a method of training an Attention-based Neural Network (ANN) to generate a textual output sequence based on a textual input sequence and a query. The textual input sequence has been formed as a sequence of content snippets obtained from respective content resources being relevant to the query. The textual output sequence is a content summary of the sequence of content snippets and to be used as a response to the query. The ANN comprises an encoder sub-network and a decoder sub-network. The method is executable by a server hosting the ANN. The method comprises, during a given training iteration of the ANN, inputting, by the server, a training query and a training textual input sequence into the encoder sub-network. The training textual input sequence is (i) formed as a sequence of training content snippets, and (ii) grouped into a sequence of input groups. A given input group is associated with a corresponding training content snippet and including words from the corresponding training content snippet. The method comprises, during a given training iteration of the ANN, generating, by the server employing the encoder sub-network, an encoded representation of the training textual input sequence. The generating includes generating attention-type outputs for respective words from the training textual input sequence by applying an attention-limiting mask onto the training textual input sequence. The attention-type outputs are used for generating the encoded representation of the training textual input sequence. When generating a given attention-type output for a given word from a given input group, the attention-limiting mask is configured to attend only to words from the given input group, such that the given attention-type output is generated based on a context from the given input group, instead of contexts from other input groups in the training textual input sequence. The method comprises, during a given training iteration of the ANN, generating, by the server employing the decoder sub-network, a decoded representation for the training textual input sequence. The decoded representation is a predicted textual output sequence. The method comprises, during a given training iteration of the ANN, generating, by the server, a penalty score for the given training iteration by comparing the predicted textual output sequence against a pre-determined textual output sequence. The pre-determined textual output sequence being a pre-determined response to the training query. The method comprises, during a given training iteration of the ANN, adjusting, by the server, the ANN based on the penalty score.

In some embodiments of the method, the given attention-type output is generated further based on a context from the given training query.

In some embodiments of the method, during the given training iteration, the ANN is trained based on a given training dataset comprising (i) the training query, (ii) the training textual input sequence, and (iii) the pre-determined textual output sequence. The method further comprises during an other given training iteration, training the ANN based on an other given training dataset. The other given training dataset comprises (i) the training query, (ii) an augmented training textual input sequence, and (iii) the pre-determined textual output sequence. The input groups in the augmented training textual input sequence is in a different order than an order of the input groups in the training textual input sequence.

In some embodiments of the method, the method further comprises generating a given training content snippet from the sequence of training content snippets. The generating comprises inputting, by the server, the respective training query and content from the respective training content resource into a Machine Learning Algorithm (MLA) configured to output a predicted content snippet. The MLA has been trained to generate the predicted content snippet such that the predicted content snippet is similar to the respective pre-determined textual output sequence. The predicted content snippet is the given training content snippet.

In some embodiments of the method, during the given training iteration the ANN is trained based on a given training dataset comprising (i) the training query, (ii) the training textual input sequence, and (iii) the pre-determined textual output sequence. The given training iteration occurs during a first training phase of the ANN, the first training phase of the ANN including a first plurality of training iterations. The method further comprises performing a second training phase of the ANN. The second training phase of the ANN includes a second plurality of training iterations. During an other given training iteration from the second plurality of training iterations the ANN is trained based on an other given training dataset. The other given training data set is one of a plurality of pre-selected training data sets to be used during the second plurality of training iterations. The other given training dataset is selected by a human assessor.

In some embodiments of the method, during the given training iteration, the ANN is trained based on a given training dataset comprising (i) the training query, (ii) the training textual input sequence, and (iii) the pre-determined textual output sequence. The pre-determined textual output sequence has been determined by a human assessor. The human assessor has determined the pre-determined textual output sequence form the content of at least one of the training content resources associated with the training content snippets.

In some embodiments of the method, the method further comprises (i) generating, by the server, a textual representation of the query based on an audio representation of a user utterance, where the user utterance is indicative of the query of a user associated with an electronic device, (ii) determining, by the server, search results responsive to the textual representation of the query, where a given search result has a respective content snippet and is indicative of a respective content resource relevant to the query, (iii) generating, by the server, the textual input sequence based on the content snippets of the respective search results, where the textual input sequence is formed as the sequence of the content snippets, (iv) inputting, by the server, the textual input sequence and the textual representation of the query into the ANN configured to output the textual output sequence, where the textual output sequence is the content summary of the sequence of content snippets and to be used as the response to the query, (v) generating, by the server, an audio representation of the textual output sequence being a machine-generated utterance of the response, (vi) providing, by the server to the electronic device associated with the user, the audio representation of the textual output sequence.

In some embodiments of the method, the adjusting comprises applying, by the server, a back-propagation technique onto the ANN.

In some embodiments of the method, the method further comprises obtaining the content snippets from respective content resources being relevant to the query.

In some embodiments of the method, the obtaining comprises executing a search using a search engine using the query as an input.

In some embodiments of the method, the obtaining further comprises retrieving top-N snippets associated with top-N results from the search.

In some embodiments of the method, the method further comprises receiving the pre-determined textual output sequence.

In some embodiments of the method, the receiving is from a human assessor.

In some embodiments of the method, the method further comprises receiving an indication of a content resource that has been used by the human assessor to generate the pre-determined textual output sequence.

In some embodiments of the method, the content resource is used to validate the pre-determined textual output sequence.

In some embodiments of the method, the content resource is a network resource responsive to the training query obtained by conducting a search using a search engine.

In a second broad aspect of the present technology, there is provided a server for training an Attention-based Neural Network (ANN) to generate a textual output sequence based on a textual input sequence and a query. The textual input sequence has been formed as a sequence of content snippets obtained from respective content resources being relevant to the query. The textual output sequence is a content summary of the sequence of content snippets and to be used as a response to the query. The ANN comprises an encoder sub-network and a decoder sub-network, the server hosts the ANN. The server is configured to, during a given training iteration of the ANN, input a training query and a training textual input sequence into the encoder sub-network. The training textual input sequence is (i) formed as a sequence of training content snippets, and (ii) grouped into a sequence of input groups. A given input group is associated with a corresponding training content snippet and includes words from the corresponding training content snippet. The server is configured to, during a given training iteration of the ANN, generate, by employing the encoder sub-network, an encoded representation of the training textual input sequence. To generate includes the server configured to generate attention-type outputs for respective words from the training textual input sequence by applying an attention-limiting mask onto the training textual input sequence. The attention-type outputs is used for generating the encoded representation of the training textual input sequence, When generating a given attention-type output for a given word from a given input group, the attention-limiting mask is configured to attend only to words from the given input group, such that the given attention-type output is generated based on a context from the given input group, instead of contexts from other input groups in the training textual input sequence. The server is configured to, during a given training iteration of the ANN, generate, by employing the decoder sub-network, a decoded representation for the training textual input sequence. The decoded representation is a predicted textual output sequence. The server is configured to, during a given training iteration of the ANN, generate a penalty score for the given training iteration by comparing the predicted textual output sequence against a pre-determined textual output sequence. The pre-determined textual output sequence is a pre-determined response to the training query. The server is configured to, during a given training iteration of the ANN, adjust the ANN based on the penalty score.

In some embodiments of the server, the given attention-type output is generated further based on a context from the given training query.

In some embodiments of the server, during the given training iteration, the ANN is trained based on a given training dataset comprising (i) the training query, (ii) the training textual input sequence, and (iii) the pre-determined textual output sequence. The server is further configured to, during an other given training iteration, train the ANN based on an other given training dataset. The other given training dataset comprises (i) the training query, (ii) an augmented training textual input sequence, and (iii) the pre-determined textual output sequence. The input groups in the augmented training textual input sequence are in a different order than an order of the input groups in the training textual input sequence.

In some embodiments of the server, the server is further configured to generate a given training content snippet from the sequence of training content snippets. To generate comprises the server configured to input the respective training query and content from the respective training content resource into a Machine Learning Algorithm (MLA) configured to output a predicted content snippet. The MLA has been trained to generate the predicted content snippet such that the predicted content snippet is similar to the respective pre-determined textual output sequence. The predicted content snippet is the given training content snippet.

In some embodiments of the server, during the given training iteration the ANN is trained based on a given training dataset comprising (i) the training query, (ii) the training textual input sequence, and (iii) the pre-determined textual output sequence. The given training iteration occurs during a first training phase of the ANN, the first training phase of the ANN includes a first plurality of training iterations. The server is further configured to perform a second training phase of the ANN. The second training phase of the ANN includes a second plurality of training iterations. During an other given training iteration from the second plurality of training iterations the ANN is trained based on an other given training dataset. The other given training data set is one of a plurality of pre-selected training data sets to be used during the second plurality of training iterations. The other given training dataset is selected by a human assessor.

In some embodiments of the server, during the given training iteration, the ANN is trained based on a given training dataset comprising (i) the training query, (ii) the training textual input sequence, and (iii) the pre-determined textual output sequence. The pre-determined textual output sequence has been determined by a human assessor. The human assessor has determined the pre-determined textual output sequence form the content of at least one of the training content resources associated with the training content snippets.

In some embodiments of the server, the server is further configured to (i) generate a textual representation of the query based on an audio representation of a user utterance, where the user utterance is indicative of the query of a user associated with an electronic device, (ii) determine search results responsive to the textual representation of the query, where a given search result has a respective content snippet and is indicative of a respective content resource relevant to the query, (iii) generate the textual input sequence based on the content snippets of the respective search results, where the textual input sequence is formed as the sequence of the content snippets, (iv) input the textual input sequence and the textual representation of the query into the ANN configured to output the textual output sequence, where the textual output sequence is the content summary of the sequence of content snippets and to be used as the response to the query, (v) generate an audio representation of the textual output sequence being a machine-generated utterance of the response, and (vi) provide, to the electronic device associated with the user, the audio representation of the textual output sequence.

In some embodiments of the server, to adjust comprises applying, by the server, a back-propagation technique onto the ANN.

In some embodiments of the server, the server is further configured to obtain the content snippets from respective content resources being relevant to the query.

In some embodiments of the server, to obtain comprises the server configured to execute a search using a search engine using the query as an input.

In some embodiments of the server, to obtain further comprises the server configured to retrieving top-N snippets associated with top-N results from the search.

In some embodiments of the server, the server is further configured to receive the pre-determined textual output sequence.

In some embodiments of the server, the server is configured to receive the pre-determined textual output sequence from a human assessor.

In some embodiments of the server, the server is further configured to receive an indication of a content resource that has been used by the human assessor to generate the pre-determined textual output sequence.

In some embodiments of the server, the content resource is used to validate the pre-determined textual output sequence.

In some embodiments of the server, the content resource is a network resource responsive to the training query obtained by conducting a search using a search engine.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings.

DETAILED DESCRIPTION

Figure 1:
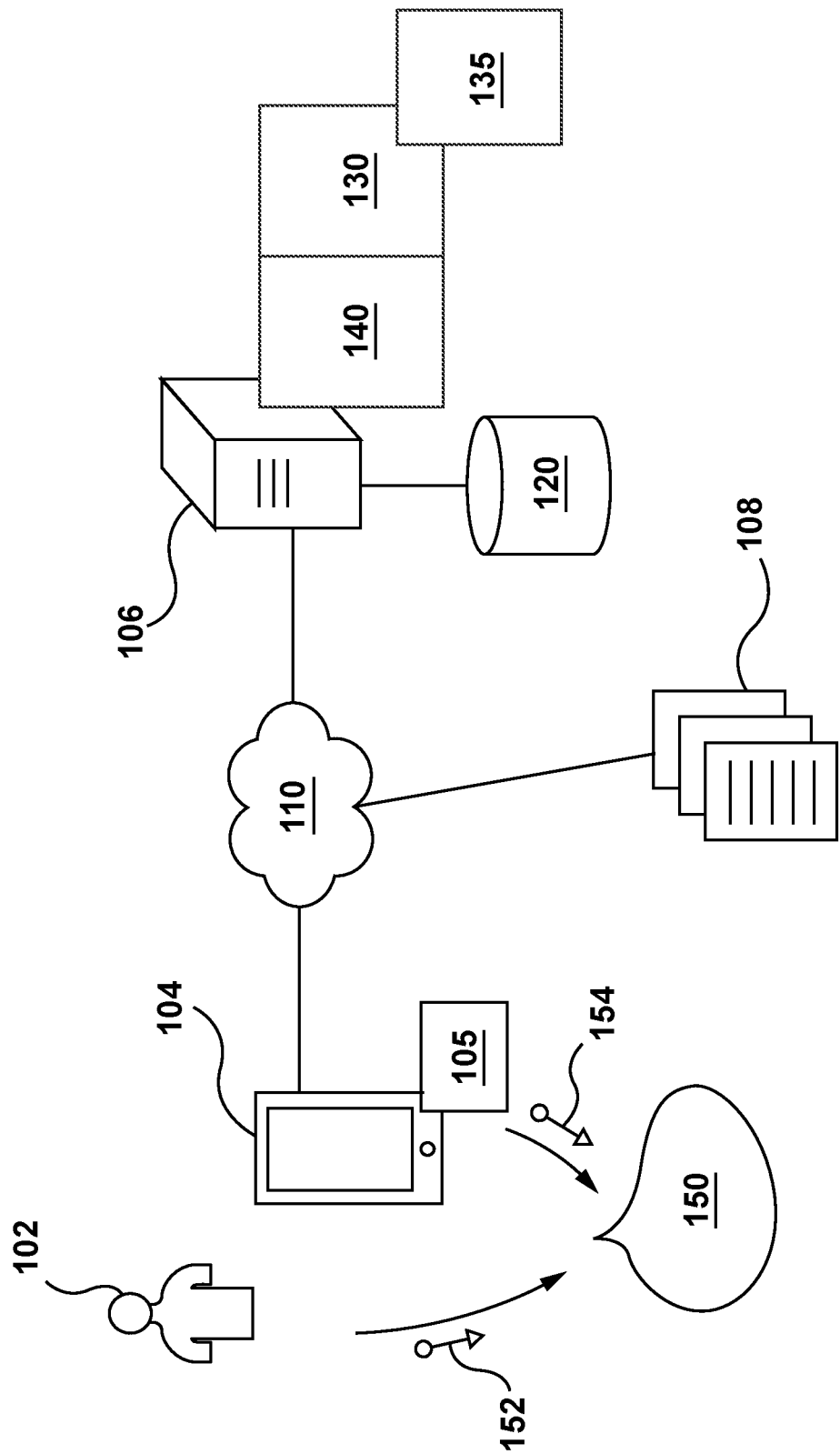
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide responses to user queries, which can be said to result in a "conversation" between a given user and a given electronic device. For example, a sound indication 152 (such as spoken utterance) from a user 102 may be detected by an electronic device 104 (or simply a "device 104"), which, in response, is configured to provide a sound indications 154 (such as spoken utterances or "machine-generated utterance"). As such, it can be said that this results in a conversation 150 between the user 102 and the device 104, where the conversation 150 is composed of (i) the sound indication 152 and (ii) the sound indication 154.

Various components of the system 100 and how these components may be configured for implementing the provision of the sound indication 154 by the electronic device 104 in response to the sound indication 152 of the user 102 will now be described.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), in order to (i) detect or capture the sound indication 152 and (ii) to provide or reproduce the sound indication 154. For example, the device 104 may comprise one or more microphones for detecting or capturing the sound indications 152 and one or more speakers for providing or reproducing the sound indications 154.

The device 104 also comprises hardware and/or software and/or firmware (or a combination thereof), in order to execute an Intelligent Personal Assistant (IPA) application 105. Generally speaking, the purpose of the IPA application 105, also known as a "chatbot", is to enable the user 102 to submit queries in a form of spoken utterances (e.g., the sound indication 152) and, in response, provide to the user 102 responses in a form of spoken utterances (e.g., the sound indication 154).

Submission of queries and provision of responses may be executed by the IPA application 105 via a natural language user interface. Generally speaking, the natural language user interface of the IPA application 105 may be any type of computer-human interface where linguistic phenomena such as verbs, phrases, clauses and the like act as user interface controls for extracting, selecting, modifying or otherwise generating data in the IPA application 105.

For example, when spoken utterances of the user 102 (e.g., the sound indication 152) are detected (i.e. captured) by the device 104, the IPA application 105 may employ its natural language user interface in order to analyze the spoken utterances of the user 102 and extract data therefrom which is indicative of user queries. Also, data indicative of responses received by the device 104, is analyzed by the natural language user interface of the IPA application 105 in order to provide or reproduce spoken utterances (e.g., the sound indication 154) indicative of those responses.

Alternatively or additionally, it is contemplated that the IPA application 105 may employ a text-based computer-human interface for enabling the user 102 to submit indications of queries in a textual format and, in response, providing the user 102 with indications of responses in a textual format, without departing from the scope of the present technology.

Communication Network

In the illustrative non-limiting example of the system 100, the device 104 is communicatively coupled to a communication network 110 for accessing and transmitting data packets to/from a server 112 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 102 and/or by the server 106. Which type of resources the plurality of resource servers 108 is hosting is not limiting. However, in some embodiments of the present technology, the resources may comprise digital documents, or simply "documents", that are representative of web pages.

For example, the plurality of resource servers 108 may host web pages, which means that the plurality of resource servers 108 may store documents representative of web pages and which are accessible by the device 102 and/or by the server 106. A given document may be written in a mark-up language and may comprise inter alia (i) content of a respective web page and (ii) computer-readable instructions for displaying the respective web page (content thereof). Therefore, in at least some embodiments of the present technology, it can be said that the plurality of resource servers 108 may host a plurality of "content resources", each of which is associated with respective content.

A given one of the plurality of resource servers 108 may be accessed by the device 102 in order to retrieve a given document (e.g., given content resource) stored on the given one of the plurality of resource servers 108. For example, the user 101 may enter a web address associated with a given web page in a given browser application (not depicted) of the device 102 and, in response, the device 102 may access a given resource server hosting the given web page in order to retrieve the document representative of the given web page for rendering the content of the web page via the given browser application.

It should be noted that a given one of the plurality of resource servers 108 may also be accessed by the server 106 in order to retrieve a given document (e.g., given content resource) stored on the given one of the plurality of resource servers 108. The purpose for the server 106 accessing and retrieving documents from the plurality of resource servers 108 will be described in greater detail herein further below.

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Broadly speaking, the server 106 is configured to (i) receive data associated with the sound indication 152 from the device 104, (ii) analyze this data and, in response, (iii) determine data for generating the sound indication 154. For example, the server 106 may be configured to receive data indicative of a user query, and in response, may be configured to generate data indicative of a response to that user query. To that end, the server 106 is configured to inter alia execute one or more computer-implemented procedures that are referred to herein as a "search engine" 130.

In some embodiments, the server 106 may be under control and/or management of a search engine provider (not depicted) such as, for example, an operator of the Yandex™ search engine. As such, the server 106 may be configured to host the search engine 130 for performing one or more searches responsive to queries submitted by users of the search engine 130.

In some embodiments, the server 106 may receive data from the device 104 indicative of the query of the user 102. For example, the IPA application 105 of the device 104 may be configured to generate a digital audio representation of the sound indication 152 (e.g., the user utterance) and transmit this digital audio representation via the communication network 110 to the server 106. In this example, the server 106 may be configured to generate a textual representation of the query submitted by the user 102 based on the digital audio representation of the user utterance and perform a search based on the so-generated textual representation of the query. In at least some embodiments of the present technology, the user 102 may use the electronic device 104 manually enter the textual representation of the query, and the response provided to the user 102 may be provided as a digital audio representation, without departing from the scope of the present technology.

It should be noted that speech-to-text processing of the digital audio representation of the user utterance may be performed locally on the device 104 (by the IPA application 108, for example) and, therefore, additionally or alternatively, the device 104 may be configured to transmit the textual representation of the query to the server 106 in addition to, or instead of, the digital audio representation.

As mentioned above, the server 106 may use the textual representation of the query to perform a search (responsive to the query) and thereby generate search results that are relevant to the query. For example, the server 106 employing the search engine 130 may be configured to generate data indicative of one or more search results relevant to the query of the user 102.

Figure 2:
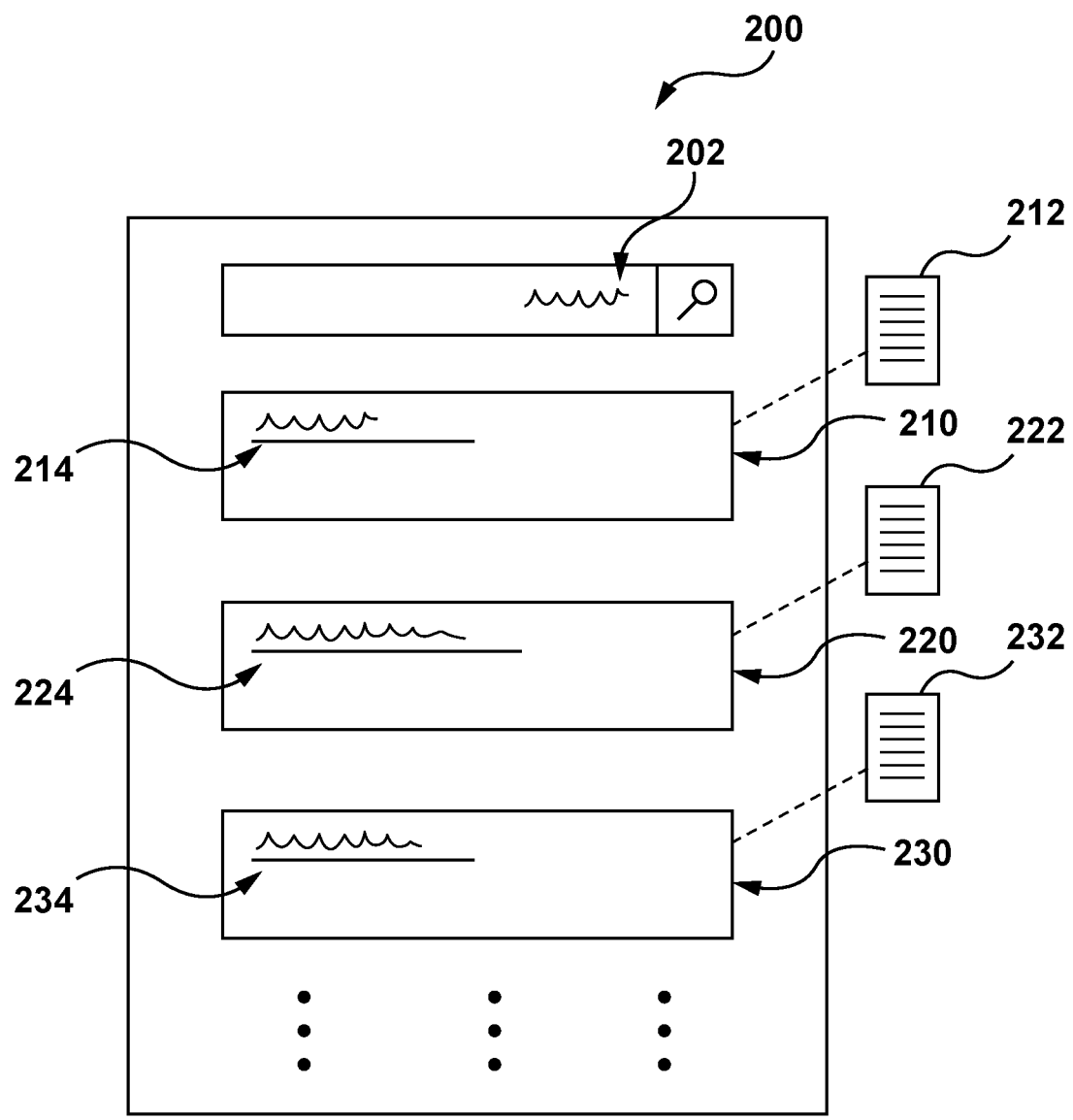
FIG. 2 is a representation of a Search Engine Result Page (SERP) generated by a server of the system of FIG. 1 in accordance with non-limiting embodiments of the present technology.

To better illustrate this, reference will now be made to FIG. 2 depicting a Search Engine Results Page (SERP) representation 200. When the user 102 submits his/her query to the search engine 130 via a given browser application, for example, the search engine 130 is typically used for generating a so-called SERP, containing one or more search results relevant to the query. As seen in FIG. 2, the search engine 130 is configured to use a textual representation of a query 202 for generating a ranked list of search results, which in this case comprises a first search result 210, a second search result 220, and a third search result 230.

It should be noted that in the non-limiting example of FIG. 2, (i) the first search result 210 is associated with a first content resource 212 and a first content snippet 214, (ii) the second search result 220 is associated with a second content resource 222 and includes a second content snippet 224, and (iii) the third search result 220 is associated with a third content resource 232 and a third content snippet 234.

The search engine 130 may be configured to determine content resources that are relevant to the user query, and rank these content resources based on inter alia the relevance of their content to the query as is known in the art.

In at least some non-limiting embodiments of the present technology, the developers of the present technology have devised methods and systems for generating "user-oriented" content snippets for respective content resources. Developers of the present technology have realized that providing content snippets that are more concise—that is, brief and comprehensive for the user—may increase user satisfaction with search engine services. Such user-oriented content snippets may reduce the amount of time necessary for parsing though search results provided by the search engine.

To that end, in at least some non-limiting embodiments of the present technology, the server 106 is configured to execute one or more computer-implemented procedures herein further referred to as a "snippet engine" 135. Broadly speaking, the snippet engine 135 is configured to generating for a given content resource a respective content snippet being a concise content summary of the content thereof.

Furthermore, developers of the present technology have realized that the snippet engine 135 capable of generating concise content snippets for various content resources can be leveraged in the context of voice-based querying. Indeed, in some embodiments of the present technology, where the user device 104 is a smart speaker, for example, it is desirable to provide voice-based search engine services to the user 102. In these embodiments, generation of concise content snippets may be used for generating machine-generating utterances that convey content relevant to the query in a more brief and comprehensive way. How the snippet engine 130 is configured to generate concise content snippets for respective content resources will be described in greater details herein further below.

It should be further noted that developers of the present technology have realized that, in the context of voice-based querying, additional processing of these concise content snippets may be necessary for further increasing user satisfaction with the briefness and comprehensiveness of machine-generated utterances. Indeed, as opposed to when a given SERP is visually displayed to a given user, provision of a ranked list of content snippets is less practical in an audible format.

To that end, the developers of the present technology have devised methods and systems that allow the server 106 to, in a sense, "summarize" the content of a plurality of content resources that are relevant to a user query, and provide this summary of content to the user 102 in an audible format (machine-generated utterance). In at least some non-limiting embodiments of the present technology, the developers of the present technology have devised an Attention-based Neural Network (ANN) 140 that is configured to generate a textual output sequence representative of such a content summary.

It is further contemplated that at least some methods and systems disclosed herein are configured to leverage the concise content snippets (generated by the snippet engine 135) in order to train the ANN 140 for generating a brief and comprehensive content summary for a plurality of content resources relevant to a given query. How the ANN 140 is configured to generate this textual output sequence representative of the content summary of the plurality of content resources will be described in greater details herein further below.

It should be noted that the server 106 may be configured to provide the device 104 with data indicative of the content summary in a textual format to be processed by the IPA application 108 for generating a respective digital audio representation and to be played to the user 102 (e.g., the sound indication 154). In other embodiments however, the server 106 may be configured to generate the digital audio representation of the content summary based on the respective textual output sequence and, therefore, the server 106 may be configured to provide the data indicative of the content summary in digital audio format.

Database System

Figure 3:
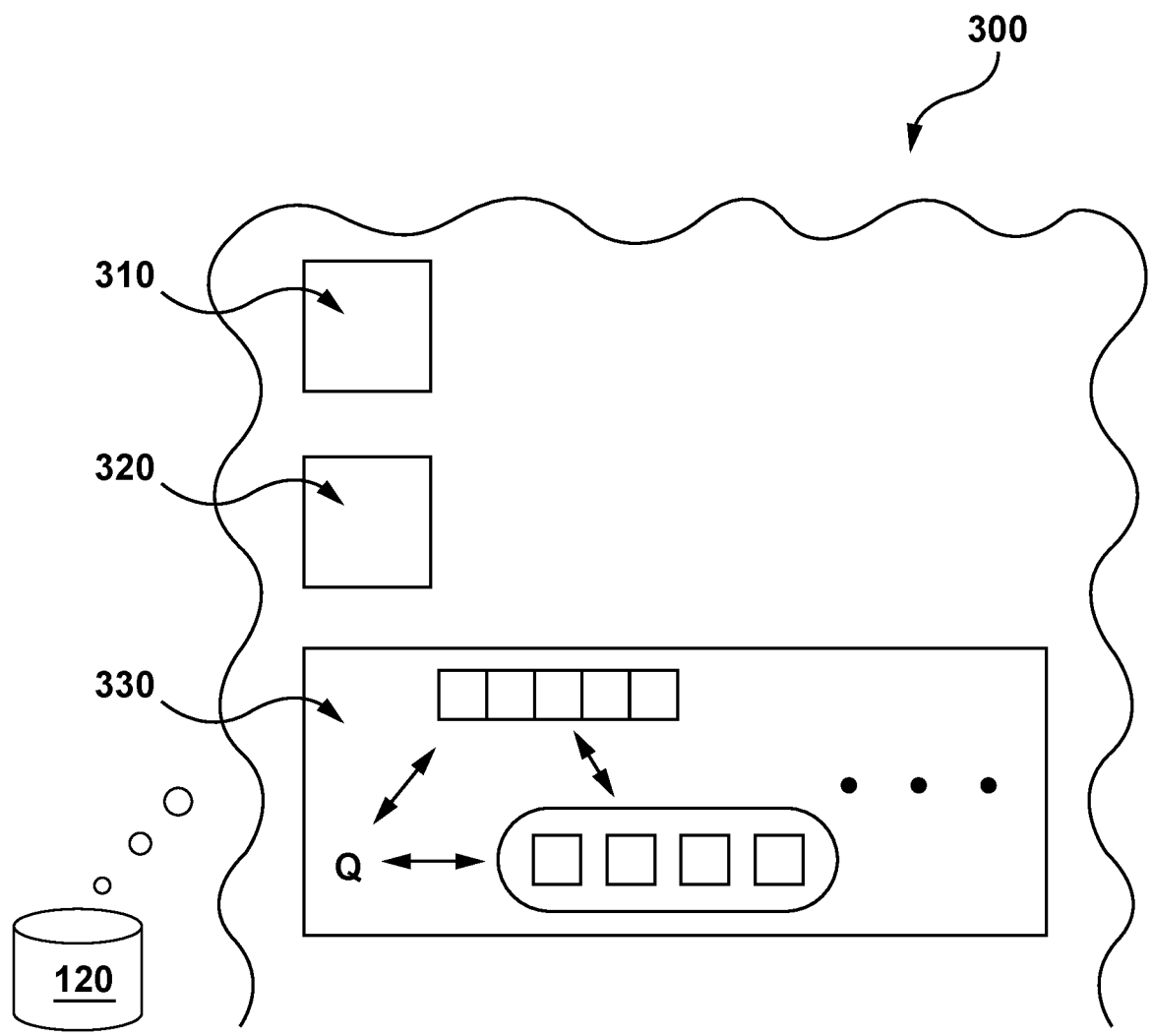
FIG. 3 depicts data stored in a database of the system of FIG. 1 in accordance with non-limiting embodiments of the present technology.

The server 106 is communicatively coupled to a database system 120. Generally speaking, the database system 120 is configured to store information extracted and/or generated by the server 106 during processing. For example, the database system 120 may receive data from the server 106 which was extracted and/or generated by the server 106 during processing for temporary and/or permanent storage thereof and may provide stored data to the server 106 for further use thereof. To better illustrate this, reference will now be made to FIG. 3 depicting a representation 300 of data stored by the database system 120, in accordance with at least some non-limiting embodiments of the present technology.

The database system 120 is configured to store search engine data 310. Generally speaking, the search engine data 310 stored in the database system 120 comprises data that enables the server 106 to provide search engine services to users of the search engine 130. In some embodiments, the search engine data 310 may comprise data about a large number of content resources (e.g., documents) that have been retrieved by a crawler application (not depicted). As such, the database system 120 may provide the server 106 with access to this larger number of documents during document retrieval operations.

It should be noted that the server 106 may be configured to execute the crawler application as part of the search engine 130. Broadly speaking, the crawler application may be used by the server 106 in order to "visit" resources accessible via the communication network 110 and to retrieve/download them for further use. For example, the crawler application may be used by the server 106 in order to access the plurality of resource servers 108 and to retrieve/download documents representative of web pages hosted by the plurality of resource servers 108. It is contemplated that the crawler application may be periodically executable by the server 106 in order to retrieve/download documents that have been updated and/or became accessible over the communication network 110 since a previous execution of the crawler application.

It should be noted that the data about the large number of content resources may be stored in the database system 120 in an indexed format—that is, the database system 120 may be configured to store an indexing structure, such as an inverted index of content resources as known in the art. For example, the database system 120 may store a plurality of posting lists associated with respective terms (e.g., words) that have been identified in the content of the content resources. A given posting list basically references a plurality of content resources that include within their content the corresponding term.

In some embodiments, the search engine data 310 stored in the database system 120 may comprise information about previously performed searches by the search engine 130. For example, the search engine data 310 may comprise query data associated with respective queries. Query data associated with a given query may be of different types and is not limiting. Just as an example, query data may comprise, but is not limited to:
- popularity of a given query;
- frequency of submission of the given query;
- number of clicks associated with the given query;
- indications of other submitted queries associated with the given query;
- indications of documents associated with the given query;
- other statistical data associated with the given query;
- textual representation of the given query;

number of characters within the given query;
audio representation(s) of the given query; and
other query-intrinsic characteristics of the given query.

It is also contemplated that the search engine data 310 stored in the database system 120 may also comprise information about content resources that have been provided by the search engine 130 as search results. Resource data associated with a given content resource may be of different types and is not limiting. For example, the resource data may comprise, but is not limited to:
popularity of a given content resource;
click-through-rate for the given content resource;
time-per-click associated with the given content resource;
indications of other documents associated with the given content resource;
indications of queries associated with the given content resource;
other statistical data associated with the given content resource;
textual data associated with the given content resource; and
other document-intrinsic characteristics of the given content resource.

The database system 120 is also configured to store human-assessor data 330. Generally speaking, human-assessor data 330 comprises information that is at least partially generated by "human-assessors" and which is used by the server 106 for training an MLA 400 (see FIG. 4) implemented as part of the snippet engine 135, and the ANN 140. How the server 106 may be configured to use the human-assessor data 330 for training the MLA 400 of the snippet engine 135 and the ANN 140 of the server 106 will be described in greater details herein further below.

Nevertheless, it should be noted that the human-assessor data 330 may comprise a plurality of human-assessed datasets. A given human-assessed dataset may include (i) an indication of a given query, (ii) an indication of a respective content resource relevant to the given query, and (iii) an indication of a human-assessed content snippet for the respective content resource. The given human-assessed dataset may be generated by providing a given human-assessor with the given query, and by collecting data provided by the given human-assessor. It should be noted that human-assessor data 330 may comprise a large number of human-assessed datasets for training purposes as it will be described.

For example, in response to the given query, the human-assessor may use the search engine 130 for performing a search responsive to the given query and acquire a plurality of search results associated with respective content resources having been identified by the search engine 130 as relevant to the given query. The human-assessor is then tasked with parsing through the content of content resources provided as search results, and generating a given human-assessed content snippet for the given query based on the content of at least one of the content resources provided as search results. In some non-limiting embodiments of the present technology, the human-assessor is also tasked to provide an indication of the at least one of the content resources provided as search results used for generating the summary (for example, for verification purposes, quality control purposes or the like).

To better illustrate this, let it be assumed that for the given query, the human-assessor uses the content of a second most relevant content resource to the given query for generating the human-assessed content snippet. In this case, the given human-assessed dataset may include (i) an indication of the given query, (ii) the indication of the second most relevant content resource, and (iii) an indication of the human-assessed content snippet generated based on the content of the second most relevant content resource.

In some non-limiting embodiments, the human-assessed content snippet may be a textual sequence found "as is" by the human-assessor in the content of the respective content resource. For example, if the given query is "John Malkovich", the human-assessor may identify from the second most relevant content resource the following textual sequence: "John Gavin Malkovich was born on Dec. 9, 1953 in the United States of America. He is a voice actor, director, producer, and fashion designer. He received Academy award nominations for his performances in Places in the Hear (1984) and In the Line of Fire (1993)", as the human-assessed content snippet.

In other non-limiting embodiments, the human-assessed content snippet may be a textual sequence based on the content of the respective content resource and which has been partially modified by the human-assessor for sake of conciseness. For example, if the given query is "John Malkovich", the human-assessor may identify from the second most relevant content resource the following textual sequence: "John Gavin Malkovich was born on Dec. 9, 1953 in the United States of America. He is a voice actor, director, producer, and fashion designer. He received Academy award nominations for his performances in Places in the Hear (1984) and In the Line of Fire (1993).", and may partially modify this textual sequence for generating a more concise human-assessed content snippet based thereon. For example, in this case, the human-assessor may be configured to generate the following human-assessed content snippet: "John Gavin Malkovich is an Academy award nominated American actor born on Dec. 9, 1953, and who is also a director, producer, and fashion designer." This means that, in some cases, the human-assessor may partially modify a given textual sequence found "as is" in the content of the respective content resource such that it represents a content summary that is more brief and comprehensive (i.e., concise) than the original textual sequence from the respective content resource.

How the snippet engine 135 hosting the MLA 400 is configured to generate concise content snippets for respective content resources will now be described in greater details.

MLA of the Snippet Engine

As mentioned above, and with reference to FIG. 4, the snippet engine 135 comprises the MLA 400. Generally speaking, MLAs are configured to "learn" from training samples and make predictions on new (unseen) data. MLAs are usually used to first build a model based on training inputs of data in order to then make data-driven predictions or decisions expressed as outputs, rather than following static computer-readable instructions. For that resource, MLAs can be used as estimation models, ranking models, classification models and the like.

It should be understood that different types of the MLAs having different architectures and/or topologies may be used for implementing the MLA 400 in some non-limiting embodiments of the present technology. However, in the context of the present technology, the MLA 400 can be said to be a given MLA that "learns", based on a given query-resource pair, to generate a predicted content snippet (e.g., in a textual format).

Broadly speaking, the implementation of the MLA 400 by the server 106 can be broadly categorized into two phases—a training phase and an in-use phase. First, the MLA 400 is trained in the training phase. Then, once the MLA 400 knows what data to expect as inputs and what data to provide as outputs, the MLA 400 is actually run using in-use data in the in-use phase. As it will become apparent herein further below, it is contemplated that the server 106 may also employ the MLA 400 for generating at least some training data for training the ANN 140.

Figure 4:
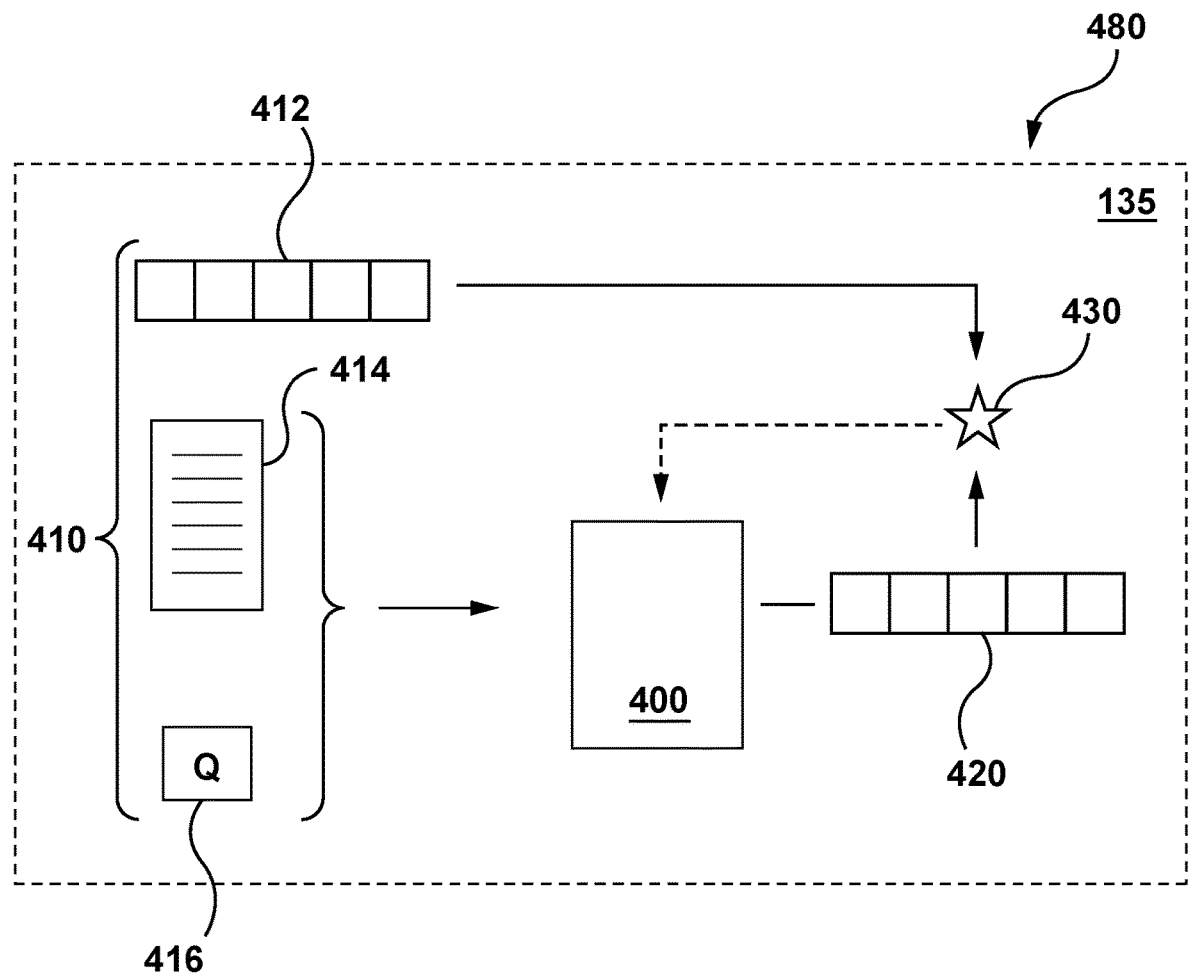
FIG. 4 is a schematic representation of a training iteration of a Machine Learning Algorithm (MLA) executed by the system of FIG. 1 configured to generate predicted content snippets for respective content resources in accordance with non-limiting embodiments of the present technology.

In FIG. 4, there is depicted a representation 480 of a single training iteration of the MLA 400. It should be noted however, that the server 106 may be configured to perform a large number of training iterations based on respective training data sets, similarly to how the server 106 is configured to perform the single training iteration of FIG. 4.

During the illustrated training iteration, the server 106 is configured to train the MLA 400 based on a training dataset 410. In at least some non-limiting embodiments of the present technology, the training dataset 410 may correspond to a respective human-assessed dataset from the plurality of human-assessed datasets stored in the database system 120. In other words, the training dataset 410 may comprise data indicative of (i) a query 416, (ii) a respective content resource 414, and (iii) a respective target content snippet 412 (e.g., a human-assessed content snippet for the respective query-resource pair).

The server 106 is configured to use (i) the query 416 and the respective content resource 414 as "inputs" into the MLA 400, and (ii) the respective target content snippet 412 as a "training target". In some embodiments, it is contemplated that data indicative the query 416 and the respective content resource 414 may be inputted into the MLA 400 in a vector format. For example, the content of the query 416 and of the respective content resource 414 may be inputted as embeddings based on respective bag-of-words representations, for example.

In response to being inputted with data representative of the query 416 and the respective content resource 414, the MLA 400 is configured to output a predicted content snippet 420. In other words, the predicted content snippet 420 is the prediction made by the MLA 400 of a given content snippet for the respective content resource 414 when, for example, the respective content resource 414 is being provided as a respective search result relevant to the query 416. It is contemplated that the predicted content snippet 420 may be outputted by the MLA 400 in a vector format, without departing from the scope of the present technology.

The server 106 is then configured to generate a penalty score 430 for the given training iteration based on the predicted content snippet 420 and the target content snippet 412 (i.e., prediction vs. target). A type of penalty metric being used for generating the penalty score 430 based on the predicted content snippet 420 and the target content snippet 412 is not particularly limiting. Nevertheless, it should be noted that the penalty score 430 is indicative of a difference between the target content snippet 412 and the predicted content snippet 420. It can also be said that the penalty score 430 may be indicative of how similar, or otherwise dissimilar, the target content snippet 412 when compared against the predicted content snippet 420.

During the given training iteration, the server 106 is configured to train the MLA 400 based on the penalty score 430. For example, the server 106 may employ a backpropagation technique in order to "adjust" the MLA 400 based on the penalty score 430. Therefore, it can be said that execution of the given training iteration by the server 106 results in the MLA 400 "learning" to generate respective predicted content snippets that are similar to the respective target content snippets (i.e., to make predictions that closer to respective targets). Recalling that target content snippets may be respective human-assessed content snippets from the database system 120, the MLA 400 may be so-trained to generate predicted content snippets that are similar to human-assessed content snippets (e.g., concise content snippets).

As previously alluded to, once the server 106 performs the large number of training iterations, the server 106 may be configured to employ the now-trained MLA 400 during its in-use phase. In one non-limiting example, the server 106 may use the MLA 400 when generating content snippets for respective search results responsive to a given query submitted to the search engine 130. To better illustrate this, returning to FIG. 2, the server 106 may be configured to use the so-trained MLA 400 to generate:

- based on the query 202 and the first content resource 212, the first content snippet 214 for the first search result 210;
- based on the query 202 and the second content resource 222, the second content snippet 224 for the second search result 220; and
- based on the query 202 and the third content resource 232, the third content snippet 234 for the third search results 230.

Furthermore, in at least some non-limiting embodiments of the present technology, in addition to being employed during generation of a given SERP by the search engine 130 of the server 130, the MLA 400 may further be employed by the server 106 for training of the ANN 140. How the ANN 140 is trained and then used by the server 106 for generating a content summary of a given SERP will now be described in greater details.

ANNs

As mentioned above, the server 106 is configured to host the ANN 140. Generally speaking, NNs are a specific class of MLAs that consist of interconnected groups of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. A given NN is thus a kind of a trained "black box", which can be used in a situation when what is in the "box" can be less important; and where having the "box" provide reasonable answers to given inputs being more important. For example, NNs are commonly used to optimize the distribution of web-traffic between servers and in data processing, including filtering, clustering, signal separation, compression, vector generation and the like.

It should be noted Encoder-Decoder models are a class of NN-based models. Encoder-Decoder models typically consist of (i) "an encoder sub-network" used to encode input data into "hidden representations" thereof, and (ii) "a decoder sub-network" used to decode these hidden representations as output data. They are often used for solving what is referred to in the art as sequence-to-sequence (seq2seq) prediction problems. Such problems include machine translation, text summarization, chatbotting, and the like.

In fact, some NNs are also referred to as seq2seq models and which are configured to turn an input sequence of data into an output sequence of data. Seq2seq models can use Recurrent NNs (RNNs), for example, to in a sense "extract" a context in which an input is used in a respective sequence. For sake of simplicity, it can be said that its encoder sub-network of a seq2seq model "turns" each input into a corresponding hidden vector (containing the input and its extracted context), whereas its decoder sub-network "reverses" the process, turning the vector into an output (and using a previous output as the input context).

Furthermore, a more recent class of seq2seq models is known as "transformers". Similar to RNN-based models, transformers are designed to handle sequential data for tasks such as translation and text summarization, for example. However, unlike RNN-based models, transformers do not require that this sequential data be processed in a specific order. For example, if the input data is a natural language sentence, the transformer does not need to process the beginning of it before the end. Due to this characteristic, transformers allow for much more parallelization than RNN-based models and, therefore, may reduce training times. Since their development, transformers have been used for solving various problems related to Natural Language Processing (NLP). Just as an example of such implementation, a transformer-based model is used in the "Bidirectional Encoder Representations from Transformers" (BERT) system that has been trained with large language datasets, and can be fine-tuned to specific language tasks.

In the context of the present technology, the ANN 140 may be embodied as a given "encoder-decoder" type model having an encoder sub-network and a decoder sub-network.

Furthermore, it is contemplated that the encoder sub-network of the ANN 140 is configured to implement a particular "attention mechanism". For example, the encoder sub-network may comprise an attention layer configured to apply an "attention-limiting mask" onto input data. As it will become apparent from the description herein further below, when determining context for a given word of the input sequence, the attention-limiting mask may be configured to attend to words from a same "input group" as the given word in the input sequence and, therefore, allows taking into account only the context of the respective input group, instead of taking into account other contexts from other input groups of the input sequence. How the ANN 400 is trained, how input groups from the input sequence are determined, and how the attention-limiting mask of the encoder sub-network is configured will now be discussed in greater details with reference to FIG. 5.

Training of the ANN

Figure 5:
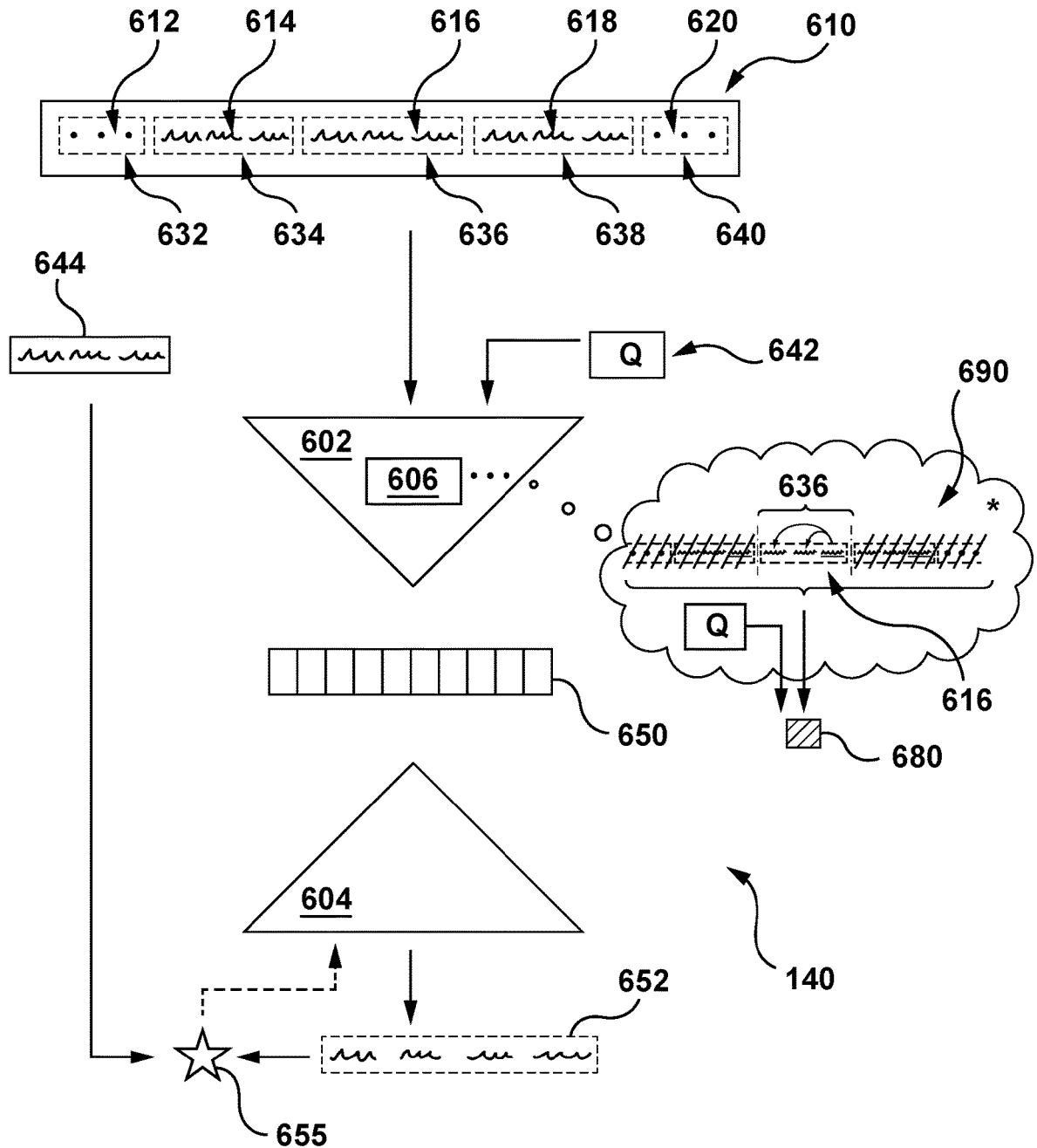
FIG. 5 is a schematic representation of a training iteration of an Attention-based Neural Network (ANN) executed by the system of FIG. 1 configured to generate predicted textual output sequences that are content summaries of the respective content resources in accordance with non-limiting embodiments of the present technology.

In FIG. 5, there is depicted a single training iteration of the ANN 140. However, it should be noted that the server 106 may perform a large number of training iterations of the ANN 140. This large number of iterations of the ANN 140 may be performed during a "main" training phase of the ANN 140. Indeed, it is contemplated that in at least some non-limiting embodiments of the present technology, the ANN 140 may be trained during more than one training phase, or otherwise be trained during a training phase having multiple stages.

It is contemplated that the ANN 140 may be configured to perform a respective plurality of training iterations during each of the more than one training phases. In some non-limiting embodiments of the present technology, the ANN 140 may have (i) a preliminary training phase during which a preliminary set of training datasets are used to configure the model, (ii) the main training phase during which a main set of training datasets are used for training the model to make good predictions, and (iii) a "anti-hallucination" training phase during which a pre-selected set of training datasets are used to adjust the model such that the model avoids making "odd" predictions. It should be noted that a given training iteration during any given training phase of the ANN 140 may be performed in a similar manner to how the training iteration of FIG. 5 is performed. However, as it will become apparent from the description herein further below, training iterations of each respective training phase of the ANN 140 may be performed by the server 106 on respective training datasets for respective training purposes.

The ANN 140 has an encoder sub-network 602 and a decoder sub-network 604. During the given training iteration, the server 106 is configured to input into the encoder sub-network 602 a training query 642 and a training textual input sequence 610.

It should be noted that the training textual input sequence 610 is formed as a sequence of training content snippets, including an $i^{th}$ training content snippet 612, a first training content snippet 614, a second training content snippet 616, a third training content snippet 618, and a $j^{th}$ training content snippet 620. In one non-limiting implementation of the present technology, the training textual input sequence 610 may be formed as a sequence of fifteen training content snippets. Nevertheless, a given training textual input sequence from a given training dataset of the ANN 140 may comprise more than or less than fifteen training content snippets, without departing from the scope of the present technology.

It should be noted that the training content snippets in the training textual input sequence 610 can be generated by the server 106 in a variety of manners. In one non-limiting example, the server 106 may use the search engine 130 for generating the training content snippets for a set of search results responsive to the training query 642. In some embodiments of the present technology, the server 106 may be configured to generate the training content snippets for the set of search results in accordance with known techniques.

However, in other embodiments of the present technology, the respective training content snippets in the training textual input sequence 610 can be generated by the MLA 400 of the snippet engine 135. For example, the server 106 may be configured to identify fifteen content resources (or any other suitable number of content resources) that are relevant to the training query 642, and generate, using the MLA 400, a respective content snippet for each of the fifteen content resources as explained above. Then, the server 106 may be configured to generate the training textual input sequence 610 by forming a sequence of content snippets of respective content resources (e.g., concatenation). Therefore, as mentioned above, it can be said that the server 106 may be configured to use the MLA 400 in order to generate at least some training data for training the ANN 140, without departing from the scope of the present technology.

It should also be noted that the training textual input sequence 610 is grouped into a sequence of "input groups". In the context of the present technology, a given input group is associated with a corresponding training content snippet and includes words from the corresponding training content snippet. In one non-limiting example, the server 106 may be configured to identify which words in the training textual input sequence 610 are to be grouped together in a given input group—to that end, the server 106 may use the respective training content snippets from the training textual input sequence 610 for associating words from the training textual input sequence 610 to respective input groups. In the illustrated example, the sequence of input groups comprises:
- an $i^{th}$ input group 632 including words from the $i^{th}$ training content snippet 612;
- a first input group 634 including words from the first training content snippet 614;
- a second input group 636 including words from the second training content snippet 616;
- a third input group 638 including words from the third training content snippet 618; and
- a $j^{th}$ input group 640 including words from the $j^{th}$ training content snippet 620.

In some embodiments of the present technology, each word from the training textual input sequence 610 may be associated with a respective position in the training textual input sequence 610. Additionally or alternatively, each input group from the sequence of input groups may be associated with a respective position in the training textual input sequence 610. In other embodiments, it is contemplated that data indicative the training query 642 and the training textual input sequence 610 may be inputted into the MLA 400 in a vector format. For example, the server 106 may be configured to generate embeddings for the training query 642 and the training textual input sequence 610 and use these embeddings as input for the encoder sub-network 602.

The encoder sub-network 602 is configured to generate an encoded representation 650 of the training textual input sequence 610. In some embodiments of the present technology, it is contemplated that the encoded representation 650 generated by the encoder sub-network 602 may be in a form of one or more vectors generated by the encoder sub-network 602 during the given training iteration to be further processed by the decoder sub-network 604.

Broadly speaking, the decoder sub-network 604 is configured to generate a "decoded representation" for the training textual input sequence 602. In the illustrated example, this decoded representation is a predicted textual output sequence 652 of the ANN 140. It should be noted that the predicted textual output sequence 652 is a prediction made by the ANN 140 and which is representative of a predicted content summary of the sequence of training content snippets from the training textual input sequence 602.

The server 106 may be configured to compare the predicted textual output sequence 652 against a pre-determined textual output sequence 644 (prediction vs. target). It is contemplated that the pre-determined textual output sequence 644 may be a given human-assessed content snippet. For example, as explained above, the server 106 may be configured to retrieve a given query and a respective human-assessed content snippet from the human-assessor data 330 stored in the database system 120, and use them, respectively, as the training query 642 and the pre-determined textual output sequence 644.

Also, the server 106 is configured to generate a penalty score 655 based on the comparison of the predicted textual output sequence 652 against the pre-determined textual output sequence 644. A type of penalty metric used by the server 106 for generating the penalty score 655 based on the predicted textual output sequence 652 and the pre-determined textual output sequence 644 is not particularly limiting. Nevertheless, it should be noted that the penalty score 655 is indicative of a difference between the predicted textual output sequence 652 and the pre-determined textual output sequence 644. It can also be said that the penalty score 430 may be indicative of how similar, or otherwise dissimilar, are the predicted textual output sequence 652 and the pre-determined textual output sequence 644.

During the given training iteration, the server 106 is configured to train the ANN 140 based on the penalty score 655. For example, the server 106 may employ a backpropagation technique in order to "adjust" the ANN 140 based on the penalty score 655. However, other training techniques may be also be used in combination with the penalty score 655 for adjusting the ANN 140 to make better predictions. Irrespective of a specific training technique being used, it can be said that execution of the given training iteration by the server 106 results in ANN 140 "learning" to generate respective predicted textual output sequences for respective queries and which are similar to the respective pre-determined textual output sequences (i.e., to make predictions that are closer to respective targets). Recalling that pre-determined textual output sequences may be representative of respective human-assessed content snippets from the database system 120, the ANN 140 may be so-trained to generate predicted textual output sequences for respective queries and which are similar to human-assessed content snippets (e.g., concise content snippets).

Returning to the description of the encoder sub-network 602, as mentioned above, the encoder sub-network 602 is configured to apply a particular attention mechanism onto the training textual input sequence 610 for generating the encoded representation 650. Broadly speaking, the encoder sub-network 602 is configured to apply an attention-limiting mask 606 onto the training textual input sequence 610 when generating attention-type outputs to be used for generating the encoded representation 650.

In some embodiments of the present technology, it can be said that attention-type output of the encoder sub-network 602 may be indicative of "contexts" in which words of the training textual input sequence 610 are used. However, it should be noted that when generating a given attention-type output for a given word from a given input group of the training textual input sequence 610, the attention-limiting mask 606 is configured to "attend" only to words from the given input group, such that the given attention-type output is generated based on a context derived from the given input group, instead of contexts derived from other input groups in the training textual input sequence 610. As a result, the encoder sub-network 602 is configured to extract a context for a given word from the training textual input sequence which depends only on words from a same training content snippet as the given word, and without taking into account words from other training content snippets of the training textual input sequence 610.

For example, let it be assumed that the encoder sub-network 602 is processing a given word associated with the third input group 636 and which is from the second training content snippet 616 having three words, as illustrated by a representation 690. As seen, when the encoder sub-network 602 is generating an attention-type output 680 for the given word, the attention-limiting mask 606 is applied onto the training textual output sequence 610 such that the encoder sub-network 602 is able to attend only to the other two words from the same input group (the second input group 636), and such that the encoder sub-network 602 does not attend to words from other input groups of the training textual input sequence 610. As a result, the encoder sub-network 602 having the attention-limiting mask 606 can be said to, when generating an attention-type output for a given word of the training textual input sequence 610, use a context from a respective input group (in this case the context derived from the second input group 636) instead of using contexts from other input groups.

It should also be noted that in addition to using a context of the respective input group, the encoder sub-network 602 may use a context of the training query 642. It is contemplated that the encoder sub-network 602 can be said to, when generating an attention-type output for a given word of the training textual input sequence 610, use a context from the training query 642 and a context from a respective input group (in this case the context derived from the second input group 636) instead of using contexts from other input groups. In at least some embodiments, it is contemplated that the context of the training query 642 may be one or more terms included in the training query 642, without departing from the scope of the present technology.

In summary, the ANN 140 can be trained, during the main training phase thereof based on a large number of iterations performed similarly to the training iteration depicted in FIG. 5. As mentioned above, the server 106 may perform this large number of operations based on respective training datasets.

It should be noted that, in at least some embodiments of the present technology, it is contemplated that during the main training phase, the server 106 may be configured to generate and use "augmented" training datasets for training the ANN 140.

To better illustrate this, reference will be made to the training dataset of FIG. 5 which includes the training textual input sequence 610, the training query 642, and the pre-determined textual output sequence 644. Recalling that the training textual input sequence 610 is formed as a sequence of training content snippets, in some non-limiting embodiments of the present technology, the server 106 may be configured to generate a given augmented training dataset by (i) re-ordering the training content snippets in the sequence of training content snippets of the training textual input sequence 610, and (ii) use a so-re-ordered training textual input sequence (instead of the sequence 610), the training query 642 and the pre-determined textual output sequence 644 as the given augmented training dataset. Therefore, it is contemplated that the server 106 may be configured to generate a given augmented training dataset based on a given training dataset by generating an augmented training textual input sequence such that the input groups in the augmented training textual input sequence are in a different order than the input groups in the training textual input sequence of the given training dataset.

Developers of the present technology have realized that training the ANN 140 based on the training datasets and based on the augmented datasets may allow the ANN 140 to make predictions that are less dependent on the order of input groups in a given textual input sequence, and rather more dependent on the contexts within the respective input groups. In at least some embodiments of the present technology, when the ANN 140 is used for generating a content summary for a given SERP based on the query and respective content snippets of the respective search results on the SERP, training the ANN 140 based on the training datasets and based on the augmented datasets may allow the ANN 140 to provide content summaries that are less dependent on the order in which the search results are listed on the SERP. As a result, content summaries generated by the ANN 140 for a given set of search results are likely to be similar to each other (more consistent content summaries) irrespective of the order in which the set of search results are ranked on the SERP.

As mentioned above, in some non-limiting embodiments of the present technology, the server 106 may further perform the anti-hallucination training phase on the ANN 140, following the main training phase thereof. Developers of the present technology have realized that, in some non-limiting implementations, the ANN 140 having been training during its main training phase may be making "odd" predictions for some in-use textual input sequences—in other words, the ANN 150 may be "hallucinating" in the sense that the prediction made for some in-use textual input sequences may be clearly erroneous.

To remedy these off predictions, in some non-limiting embodiments of the present technology, the server 106 may be configured to perform the anti-hallucination training phase during which a set of "best" training datasets are selected for adjusting the predictive quality of the ANN 140. This set of best training datasets may be pre-selected by the human assessors. The server 106 may also pre-select these training datasets as a subset of training datasets where the pre-determined textual output sequence can be found in one or more snippets of a respective training textual input sequence.

Once the ANN 140 is trained by the server 106, the server 106 may be configured to employ the ANN 140 during its in-use phase. How the server 106 may be configured to employ the ANN 140 during its in-use phase in at least some non-limiting embodiments of the present technology will now be described with reference to FIG. 6.

In-Use Phase of the ANN

Figure 6:
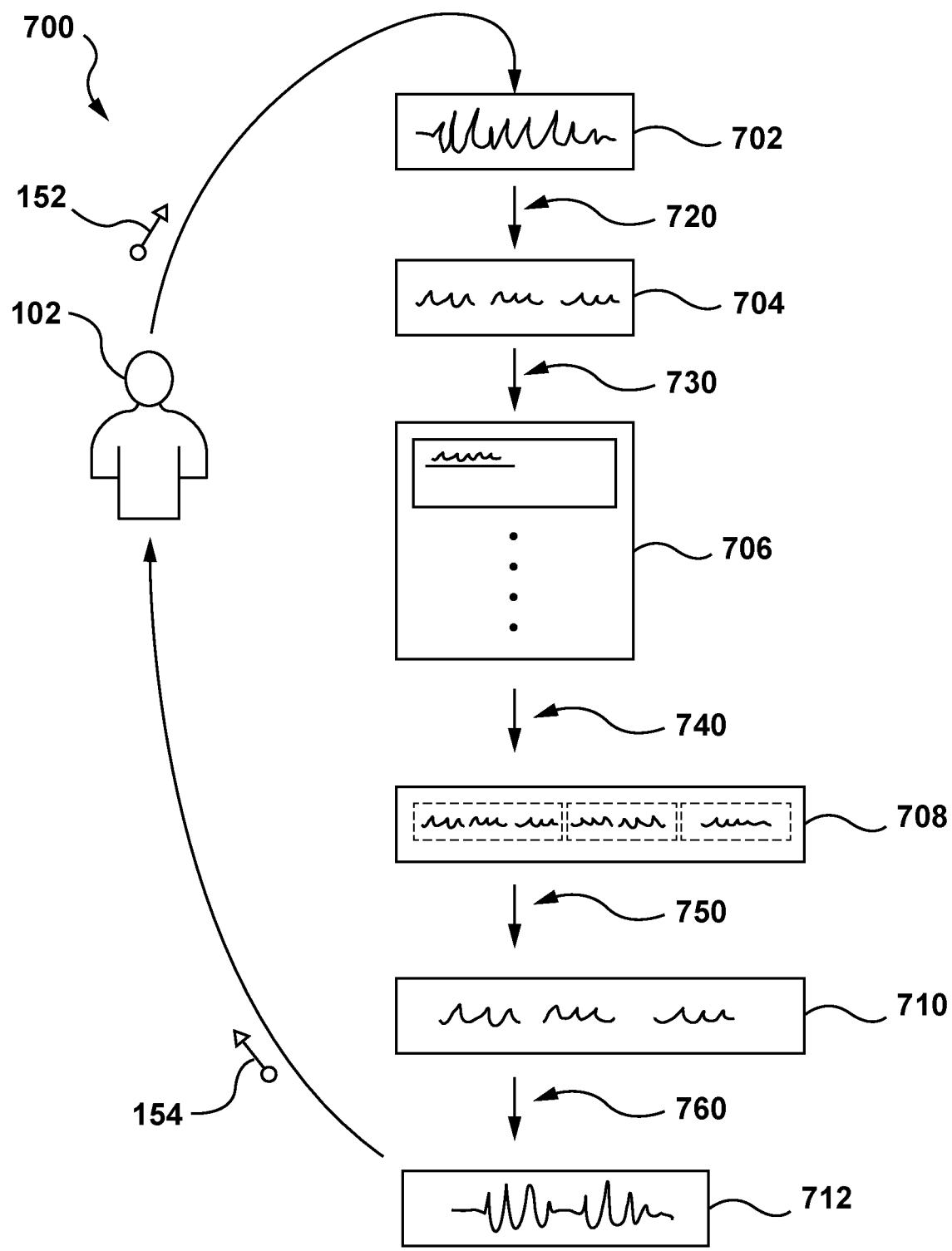
FIG. 6 is a schematic block illustration of the processing of a user utterance of the user in the system of FIG. 1 for providing a machine-generated utterance to the user in accordance with non-limiting embodiments of the present technology.

In FIG. 6, there is depicted a representation 700 of how the ANN 140 may be used during its in-use phase by the server 106. As seen, the sound indication 152 may be captured and an audio representation 702 of the user utterance of the user 102 may be generated by the electronic device 104. The audio representation 702 may be processed in order to generate a textual representation 704 of a user query. It should be noted that speech-to-text (STT) processing procedure 720 may be performed in a variety of ways by the electronic device 104 and/or by the server 106, without departing from the scope of the present technology.

The server 106 may be configured to perform a "search" in response to the textual representation 704 of the user query. In other words, the server 106 may perform a searching procedure 730 for retrieving one or more content resources that are relevant to the user query. In some embodiments, the server 106 may employ the search engine 130 in order to retrieve a plurality of content resources that are relevant to the user query. It should be noted that the server 106 may also use the snippet engine 135 in order to generate in-use content snippets for respective ones from the plurality of content resources. As such, the server 106 may be configured to generate a SERP 706 including a plurality of search results, each of which is associated with a respective content resource relevant to the user query and having a respective in-use content snippet generated based on the content from the respective content resource.

The server 106 may be configured to use information generated by the search engine 130 and the snippet engine 135 in order to perform an in-use dataset generation procedure 740. Broadly speaking, during the in-use dataset generation procedure 740, the server 106 is configured to use the information generated by the search engine 130 and the snippet engine 135 in order to generate an in-use textual input sequence 708. For example, the server 106 may be configured to form the in-use textual input sequence 708 as a sequence of the in-use content snippets generated by the snippet engine 135 for the respective content resources relevant to the user query.

The server 106 may be configured to input the textual representation 704 of the user query and the in-use textual input sequence 708 into the trained ANN 140. As such, it can be said that the server 106 may be configured to perform a summarization procedure 750, during which a given in-use iteration of the ANN 140 is performed on the input the textual representation 704 of the user query and the in-use textual input sequence 708. As a result, the trained ANN 140 outputs for the server 106 an in-use textual output sequence 710 being a (predicted) content summary of the sequence of in-use content snippets (e.g., generated by the search engine in accordance with some known techniques, and/or generated by the snippet engine 135 as described above) and which is to be used as the response to the user query.

The server 106 may also be configured to generate an audio representation 712 of the textual output sequence 710. The audio representation 712 is to be used as a machine-generated utterance of the response. It is contemplated that a text-to-speech (TTS) processing procedure 750 may be performed by the server 106 and/or by the electronic device 104. Once acquired and/or generated by electronic device 104, the electronic device 104 may use the audio representation 712 in order to generate the sound indication 154 for the user 102 via one or more speakers, for example.

Figure 7:
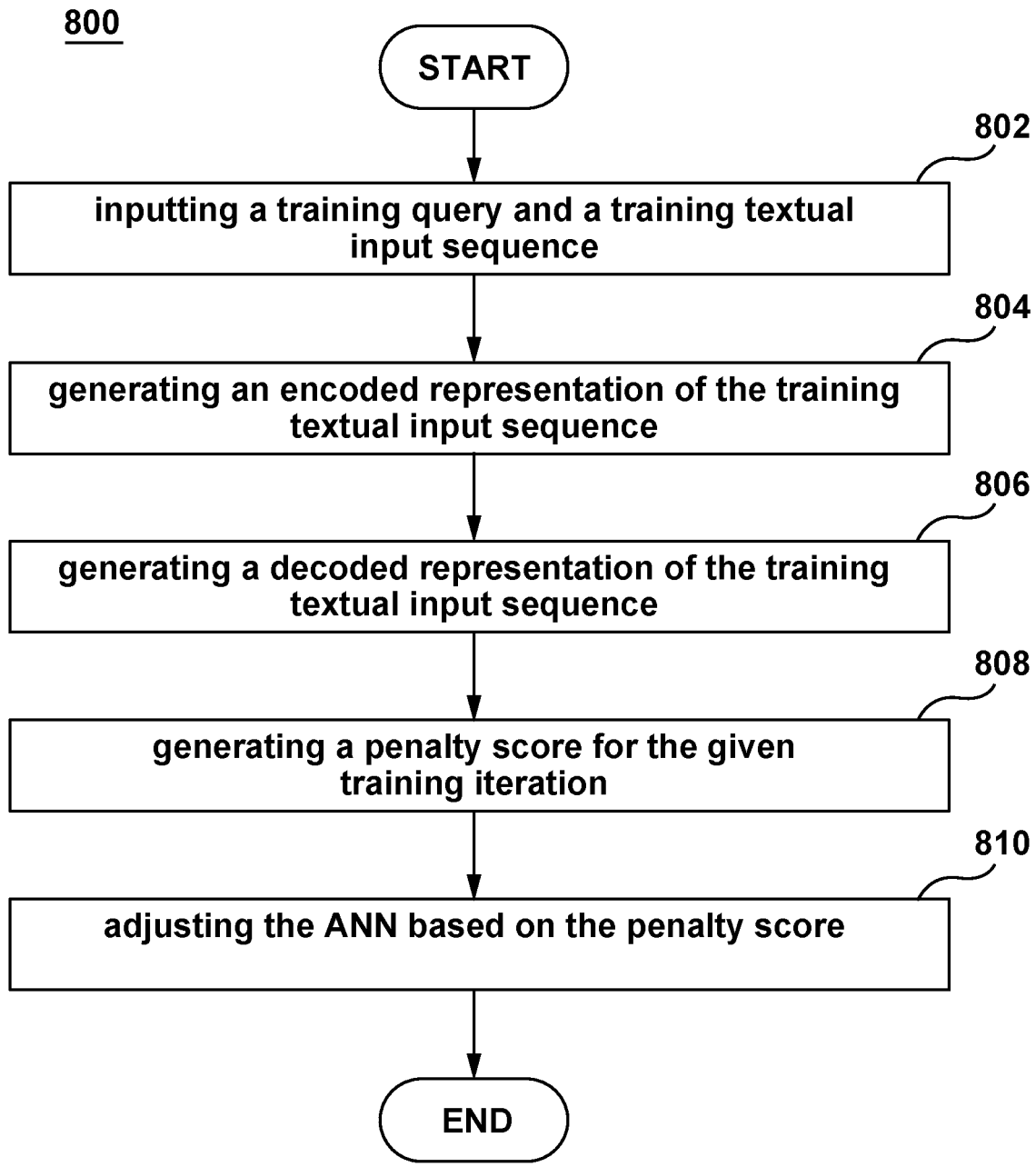
FIG. 7 is a scheme-block illustration of a method of training the ANN of FIG. 5 in accordance with other non-limiting embodiments of the present technology.

In some non-limiting embodiments of the present technology, the server 106 may be configured to execute a method 800 depicted on FIG. 7. Various steps of the method 800 will now be described in greater detail.

STEP 802: Inputting a Training Query and a Training Textual Input Sequence

The method 800 begins at step 802 with the server 106 configured to, during a given training iteration of the ANN 140, input the training query 642 and the training textual input sequence 610 into the encoder sub-network 602 (see FIG. 5). The training textual input sequence 640 being (i) formed as a sequence of training content snippets (e.g., sequence including content snippets 612, 614, 616, 618, 620), and (ii) grouped into a sequence of input groups (e.g., sequence including the input groups 632, 634, 636, 638, 640). It should be noted that a given input group is associated with a corresponding training content snippet and includes words from the corresponding training content snippet.

In some embodiments, the training content snippets in the training textual input sequence may be generated by the server 106 employing the search engine 130. For example, the server 106 may perform a search and use the content snippets associated with at least some relevant search results as respective training content snippets. In some embodiments, the training content snippets may be generated as known in the art.

In some embodiments, the server 106 may obtain the training content snippets from respective content resources being relevant to the training query 642. It is contemplated that the server 106 may obtain the training content snippets by executing a search using the search engine 130 using the training query 642 as an input. It is also contemplated that the server 106 may obtain the training content snippets by retrieving top-N snippets associated with top-N results from the search.

In other embodiments, the server 106 may be configured to generate a given training content snippet from the sequence of training content snippets. In some embodiments, the server 106 may be configured to input the training query 642 and the content from the respective training content resource into the MLA 400 configured to output a given predicted content snippet. As explained above, the MLA 400 can be trained by the server 106 to generate the given predicted content snippet such that the predicted content snippet is similar to the respective pre-determined textual output sequence, and where the predicted content snippet is the given training content snippet that is to be used as part of the training textual input sequence 610.

STEP 804: Generating an Encoded Representation of the Training Textual Input Sequence The method 800 continues to step 804 with the server 106 configured to generate, by employing the encoder sub-network 602, the encoded representation 650 of the training textual input sequence 610. For generating the encoded representation 650, the server 106 may be configured to generate attention-type outputs (such as the attention type output 680) for respective words from the training textual input sequence 610 by applying the attention-limiting mask 606 onto the training textual input sequence 610. The attention-type outputs are used by the server 106 for generating the encoded representation 650 of the training textual input sequence 610.

It should be noted that, when generating the attention-type output 680 for a given word from the input group 636, the attention-limiting mask 606 is configured to attend only to words from the input group 636, such that the attention-type output 680 is generated based on a context from the input group 636, instead of contexts from other input groups in the training textual input sequence 610.

It should also be noted that in addition to use a context of the respective input group, the encoder sub-network may use a context of the training query 642. It is contemplated that the encoder sub-network 602 can be said to, when generating an attention-type output for a given word of the training textual input sequence 610, use a context from the training query 642 and a context from a respective input group (in this case the context derived from the second input group 636) instead of using contexts from other input groups. In at least some embodiments, it is contemplated that the context of the training query 642 may be based on one or more terms included in the training query 642, without departing from the scope of the present technology.

STEP 806: Generating a Decoded Representation for the Training Textual Input Sequence The method 800 continues to step 806 with the server 106 configured to generate, by employing the decoder sub-network 604, a decoded representation 652 for the training textual input sequence 610, the decoded representation 652 being the predicted textual output sequence of the ANN 140. It is contemplated that the decoded representation 652 may be outputted in a vector format by the ANN 140, without departing form the scope of the present technology.

In some embodiments, it is contemplated that the decoder sub-network 604 may employ its own attention mechanism. For example, the attention mechanism of the decoder sub-network 604 may be implemented similarly to how an attention mechanism of a decoder from a transformer network is implemented. In some cases, it can be said that the attention mechanism of the decoder subnetwork 604 may be implemented as is known in the art for transformer networks.

STEP 808: Generating a Penalty Score for the Given Training Iteration

The method 800 continues to step 808 with the server 106 configured to generate the penalty score 655 for the given training iteration by comparing the predicted textual output sequence 652 against the pre-determined textual output sequence 644. The pre-determined textual output sequence is a pre-determined response to the training query 642.

In some embodiments, it should be noted that the server 106 may further be configured to receive the pre-determined textual output sequence 644. In some embodiments, the pre-determined textual output sequence 644 may be received from a human assessor (e.g., generated by a human assessor and stored in the database system 120, as explained above). In some embodiments, the server 106 may also be configured to receive an indication of a content resource that has been used by the human assessor to generate the pre-determined textual output sequence 644. In some embodiments the indication of the content resource may be received by the server 106 from the database system 120 and may be a given content resource associated with the pre-determined textual output sequence 644 in a given human-assessed dataset. In one non-limiting example, the content resource may be used to validate the pre-determined textual output sequence 644. It is further contemplated that the content resource may be a network resource responsive to the training query 642 obtained by conducting a search using the search engine 130, without departing from the scope of the present technology.

STEP 810: Adjusting the ANN Based on the Penalty Score

The method 800 continues to step 810 with the server 106 configured to adjust the ANN 140 based on the penalty score 655. In one non-limiting example, the server 106 may apply a back-propagation technique onto the ANN 140 based on the penalty score 655 for adjusting the ANN 140.

In some embodiments of the present technology, the server 106 may be configured to perform a large number of training iterations similarly to the training iteration illustrated on FIG. 5. For example, during the given training iteration, the ANN 140 is trained based on a given training dataset comprising (i) the training query 642, (ii) the training textual input sequence 610, and (iii) the pre-determined textual output sequence 644. In some embodiments of the present technology, the server 106 may also be configured to, during an other given training iteration, train the ANN 140 based on an other given training dataset (an augmented training dataset). For example, the other given training dataset may comprise (i) the training query 642, (ii) an augmented training textual input sequence, and (iii) the pre-determined textual output sequence 644, and the input groups in the augmented training textual input sequence are in a different order than an order of the input groups in the training textual input sequence 610.

In some embodiments of the present technology, the server 106 may be configured to perform the given training iteration illustrate on FIG. 5 during a first (and/or main) training phase of the ANN 140. However, the server 106 may also be configured to perform a second training phase (e.g., anti-hallucination training phase) of the ANN 140 which includes a second plurality of training iterations. During an other given training iteration from the second plurality of training iterations, the server 106 may be configured to train the ANN 140 based on an other given training dataset being one of a plurality of pre-selected training datasets to be used during the second plurality of training iterations. For example, the other given training dataset may be selected by a human assessor.

In some embodiments of the present technology, the pre-determined textual output sequence 644 may have been determined by a human assessor. For example, the pre-determined textual output sequence 644 may be retrieved from the human-assessed data 330 stored in the database system 120. As such, a given human assessor may have determined the pre-determined textual output sequence 644 form the content of at least one of the training content resources associated with the training content snippets in the training textual content sequence 610.

In other embodiments of the present technology, the server 106 may further be configured to perform an in-use of the ANN 140. For example, the server 106 may further be configured to generate the textual representation 704 (see FIG. 6) of the query based on the audio representation 702 of a user utterance where the user utterance is indicative of the query of the user 102 associated with the electronic device 104. The server 106 may also determine search results responsive to the textual representation 704 of the query, where a given search result has a respective content snippet and is indicative of a respective content resource relevant to the query. The server 106 may be configured to perform a "search" in response to the textual representation 704 of the user query. In other words, the server 106 may perform the searching procedure 730 for retrieving one or more content resources that are relevant to the user query. In some embodiments, the server 106 may employ the search engine 130 in order to retrieve a plurality of content resources that are relevant to the user query. It should be noted that the server 106 may also use the snippet engine 135 in order to generate in-use content snippets for respective ones from the plurality of content resources. As such, the server 106 may be configured to generate a SERP 706 including a plurality of search results, each of which is associated with a respective content resource relevant to the user query and having a respective in-use content snippet generated based on the content from the respective content resource.

The server 106 may also be configured to generate the textual input sequence 708 based on the content snippets of the respective search results, and where the textual input sequence 708 is formed as the sequence of the content snippets. The server 106 may also input the textual input sequence 708 and the textual representation 704 of the query into the ANN 140 configured to output the textual output sequence 710. The textual output sequence 710 may be the content summary of the sequence of content snippets and may be used as the response to the query. The server 106 may also generate the audio representation 712 of the textual output sequence 750 being a machine-generated utterance of the response. The server 106 may also provide the electronic device 104 with the audio representation 712 of the textual output sequence.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training an Attention-based Neural Network (ANN) to generate a textual output sequence based on a textual input sequence and a query, the textual input sequence having been formed as a sequence of content snippets obtained from respective content resources being relevant to the query, the textual output sequence being a content summary of the sequence of content snippets and to be used as a response to the query, the ANN comprising an encoder sub-network and a decoder sub-network, the method executable by a server hosting the ANN, the method comprising:

during a given training iteration of the ANN:
   inputting, by the server, a training query and a training textual input sequence into the encoder sub-network,
      the training textual input sequence being (i) formed as a sequence of training content snippets, and (ii) grouped into a sequence of input groups,
         a given input group being associated with a corresponding training content snippet and including words from the corresponding training content snippet;
   generating, by the server employing the encoder sub-network, an encoded representation of the training textual input sequence, the generating including:
      generating attention-type outputs for respective words from the training textual input sequence by applying an attention-limiting mask onto the training textual input sequence, the attention-type outputs being used for generating the encoded representation of the training textual input sequence,
         when generating a given attention-type output for a given word from a given input group, the attention-limiting mask being configured to attend only to words from the given input group, such that the given attention-type output is generated based on a context from the given input group, instead of contexts from other input groups in the training textual input sequence;
   generating, by the server employing the decoder sub-network, a decoded representation for the training textual input sequence,
      the decoded representation being a predicted textual output sequence,
   generating, by the server, a penalty score for the given training iteration by comparing the predicted textual output sequence against a pre-determined textual output sequence, the pre-determined textual output sequence being a pre-determined response to the training query; and
   adjusting, by the server, the ANN based on the penalty score.

2. The method of claim 1, wherein the given attention-type output is generated further based on a context from the given training query.

3. The method of claim 1, wherein during the given training iteration, the ANN is trained based on a given training dataset comprising (i) the training query, (ii) the training textual input sequence, and (iii) the pre-determined textual output sequence,
   the method further comprising during an other given training iteration, training the ANN based on an other given training dataset,
      the other given training dataset comprising (i) the training query, (ii) an augmented training textual input sequence, and (iii) the pre-determined textual output sequence,
         the input groups in the augmented training textual input sequence being in a different order than an order of the input groups in the training textual input sequence.

4. The method of claim 1, wherein the method further comprises generating a given training content snippet from the sequence of training content snippets, the generating comprising:
   inputting, by the server, the respective training query and content from the respective training content resource into a Machine Learning Algorithm (MLA) configured to output a predicted content snippet,
      the MLA has been trained to generate the predicted content snippet such that the predicted content snippet is similar to the respective pre-determined textual output sequence,
         the predicted content snippet being the given training content snippet.

5. The method of claim 1, wherein during the given training iteration the ANN is trained based on a given training dataset comprising (i) the training query, (ii) the training textual input sequence, and (iii) the pre-determined textual output sequence,
   the given training iteration occurring during a first training phase of the ANN, the first training phase of the ANN including a first plurality of training iterations,
   the method further comprising performing a second training phase of the ANN, the second training phase of the ANN including a second plurality of training iterations,
   during an other given training iteration from the second plurality of training iterations the ANN being trained based on an other given training dataset,
      the other given training data set being one of a plurality of pre-selected training data sets to be used during the second plurality of training iterations,
         the other given training dataset being selected by a human assessor.

6. The method of claim 1, wherein during the given training iteration, the ANN is trained based on a given training dataset comprising (i) the training query, (ii) the training textual input sequence, and (iii) the pre-determined textual output sequence,
   the pre-determined textual output sequence having been determined by a human assessor,
      the human assessor having determined the pre-determined textual output sequence form the content of at least one of the training content resources associated with the training content snippets.

7. The method of claim 1, wherein the method further comprises:
   generating, by the server, a textual representation of the query based on an audio representation of a user utterance,
      the user utterance being indicative of the query of a user associated with an electronic device;
   determining, by the server, search results responsive to the textual representation of the query,
      a given search result having a respective content snippet and being indicative of a respective content resource relevant to the query;
   generating, by the server, the textual input sequence based on the content snippets of the respective search results,
      the textual input sequence being formed as the sequence of the content snippets;
   inputting, by the server, the textual input sequence and the textual representation of the query into the ANN configured to output the textual output sequence,
      the textual output sequence being the content summary of the sequence of content snippets and to be used as the response to the query;
   generating, by the server, an audio representation of the textual output sequence being a machine-generated utterance of the response; and
   providing, by the server to the electronic device associated with the user, the audio representation of the textual output sequence.

8. The method of claim 1, wherein the adjusting comprises applying, by the server, a back-propagation technique onto the ANN.

9. The method of claim 1, wherein the method further comprises obtaining the content snippets from respective content resources being relevant to the query.

10. The method of claim 9, wherein the obtaining comprises executing a search using a search engine using the query as an input.

11. The method of claim 10, wherein the obtaining further comprises retrieving top-N snippets associated with top-N results from the search.

12. The method of claim 1, wherein the method further comprises receiving the pre-determined textual output sequence.

13. The method of claim 12, wherein the receiving is from a human assessor.

14. The method of claim 13, wherein the method further comprises receiving an indication of a content resource that has been used by the human assessor to generate the pre-determined textual output sequence.

15. The method of claim 14, wherein the content resource is used to validate the pre-determined textual output sequence.

16. The method of claim 15, wherein the content resource is a network resource responsive to the training query obtained by conducting a search using a search engine.

17. A server for training an Attention-based Neural Network (ANN) to generate a textual output sequence based on a textual input sequence and a query, the textual input sequence having been formed as a sequence of content snippets obtained from respective content resources being relevant to the query, the textual output sequence being a content summary of the sequence of content snippets and to be used as a response to the query, the ANN comprising an encoder sub-network and a decoder sub-network, the server hosting the ANN, the server configured to:
during a given training iteration of the ANN:
input a training query and a training textual input sequence into the encoder sub-network,
the training textual input sequence being (i) formed as a sequence of training content snippets, and (ii) grouped into a sequence of input groups,
a given input group being associated with a corresponding training content snippet and including words from the corresponding training content snippet;
generate, by employing the encoder sub-network, an encoded representation of the training textual input sequence, to generate including the server configured to:
generate attention-type outputs for respective words from the training textual input sequence by applying an attention-limiting mask onto the training textual input sequence, the attention-type outputs being used for generating the encoded representation of the training textual input sequence,
when generating a given attention-type output for a given word from a given input group, the attention-limiting mask being configured to attend only to words from the given input group, such that the given attention-type output is generated based on a context from the given input group, instead of contexts from other input groups in the training textual input sequence;
generate, by employing the decoder sub-network, a decoded representation for the training textual input sequence,
the decoded representation being a predicted textual output sequence,
generate a penalty score for the given training iteration by comparing the predicted textual output sequence against a pre-determined textual output sequence, the pre-determined textual output sequence being a pre-determined response to the training query; and
adjust the ANN based on the penalty score.

18. The server of claim 17, wherein the given attention-type output is generated further based on a context from the given training query.

19. The server of claim 17, wherein during the given training iteration, the ANN is trained based on a given training dataset comprising (i) the training query, (ii) the training textual input sequence, and (iii) the pre-determined textual output sequence,
the server being further configured to, during an other given training iteration, train the ANN based on an other given training dataset,
the other given training dataset comprising (i) the training query, (ii) an augmented training textual input sequence, and (iii) the pre-determined textual output sequence,
the input groups in the augmented training textual input sequence being in a different order than an order of the input groups in the training textual input sequence.

20. The server of claim 17, wherein the server is further configured to generate a given training content snippet from the sequence of training content snippets, to generate comprising the server being configured to:
input the respective training query and content from the respective training content resource into a Machine Learning Algorithm (MLA) configured to output a predicted content snippet,
the MLA has been trained to generate the predicted content snippet such that the predicted content snippet is similar to the respective pre-determined textual output sequence,
the predicted content snippet being the given training content snippet.

* * * * *